(12) United States Patent
Suntych

(10) Patent No.: US 12,495,477 B2
(45) Date of Patent: Dec. 9, 2025

(54) MOBILE REAL TIME LOCATION UNIT

(71) Applicant: Xiant Technologies, Inc., Greeley, CO (US)

(72) Inventor: Jon Daren Suntych, Greeley, CO (US)

(73) Assignee: Xiant Technologies, Inc., Greeley, CO (US)

( * ) Notice: Subject to any disclaimer, the term of this patent is extended or adjusted under 35 U.S.C. 154(b) by 369 days.

(21) Appl. No.: 17/757,339

(22) PCT Filed: Dec. 17, 2020

(86) PCT No.: PCT/US2020/065634
§ 371 (c)(1),
(2) Date: Jun. 14, 2022

(87) PCT Pub. No.: WO2021/127193
PCT Pub. Date: Jun. 24, 2021

(65) Prior Publication Data
US 2023/0023110 A1 Jan. 26, 2023

Related U.S. Application Data
(60) Provisional application No. 62/951,241, filed on Dec. 20, 2019.

(51) Int. Cl.
*H05B 47/155* (2020.01)
*A01G 7/04* (2006.01)
(Continued)

(52) U.S. Cl.
CPC ......... *H05B 47/155* (2020.01); *A01G 7/045* (2013.01); *A01K 29/00* (2013.01); *A01K 29/005* (2013.01); *A01K 45/00* (2013.01); *A61M 21/00* (2013.01); *A61N 5/06* (2013.01);
*H05B 45/00* (2020.01); *H05B 45/10* (2020.01); *H05B 45/14* (2020.01); *H05B 47/105* (2020.01); *H05B 47/16* (2020.01);
(Continued)

(58) Field of Classification Search
CPC ....... H05B 47/155; H05B 47/19; H05B 45/00
See application file for complete search history.

(56) References Cited

U.S. PATENT DOCUMENTS 4,814,711 A * 3/1989 Olsen ..................... G01V 3/165
342/357.41
2008/0077199 A1 3/2008 Shefi et al.
(Continued)

FOREIGN PATENT DOCUMENTS

JP 2016002027 A2 1/2016
KR 20160041129 A 4/2016
(Continued)

OTHER PUBLICATIONS

PCT Search report for PCT/US2020/065634 mailed on May 7, 2021.
(Continued)

*Primary Examiner* — Anne M Hines
(74) *Attorney, Agent, or Firm* — Weatherly IP Solutions; James M. Weatherly

(57) ABSTRACT

The present disclosure provides mobile real time location units for use with an organism, such as a mammal, bird or plant to allow lighting networks to monitor the location, status, health and environment of the organism and to adjust the photon signal of the lighting network based on the needs of the organism.

16 Claims, 5 Drawing Sheets

(51) Int. Cl.
- *A01K 29/00* (2006.01)
- *A01K 45/00* (2006.01)
- *A61M 21/00* (2006.01)
- *A61N 5/06* (2006.01)
- *H05B 45/00* (2022.01)
- *H05B 45/10* (2020.01)
- *H05B 45/14* (2020.01)
- *H05B 47/105* (2020.01)
- *H05B 47/16* (2020.01)
- *H05B 47/19* (2020.01)

(52) U.S. Cl.
CPC ..... *H05B 47/19* (2020.01); *A61M 2021/0044* (2013.01); *A61M 2205/3306* (2013.01); *A61M 2250/00* (2013.01); *A61N 2005/0652* (2013.01)

(56) References Cited

U.S. PATENT DOCUMENTS

| | | |
|---|---|---|
| 2008/0146890 A1 | 6/2008 | Leboeuf et al. |
| 2014/0069002 A1 | 3/2014 | Morgan et al. |
| 2014/0140056 A1 | 5/2014 | Morgan et al. |
| 2014/0288351 A1 | 9/2014 | Jones |
| 2017/0080246 A1 | 3/2017 | Knight |
| 2018/0320872 A1* | 11/2018 | Weeks, Jr. .............. A61L 2/084 |
| 2019/0259108 A1 | 8/2019 | Bongartz et al. |

FOREIGN PATENT DOCUMENTS

| | | |
|---|---|---|
| WO | 2018023133 A1 | 2/2018 |
| WO | 2019049116 A2 | 3/2019 |
| WO | 2019195816 A1 | 10/2019 |
| WO | 2021127193 A1 | 6/2021 |

OTHER PUBLICATIONS

Communication pursuant to Rules 70(2) and 70a(2) EPC (containing Extended European Search Report) for European Patent Application No. 20901071.9 dated Dec. 12, 2023, 10 pages.

First Office Action for Chinese Patent Application No. 202080088105.0 with English translation dated May 7, 2024, 15 pages.

Office Action for Canadian Patent Application No. 3164783 mailed Sep. 13, 2023, 3 pages,.

Response to Communication pursuant to Rules 70(2) and 70a(2) EPC for European Patent Application No. 20901071.9 submitted Jun. 11, 2024, 55 pages.

Response to Office Action for Canadian Patent Application No. 3164783 submitted Mar. 13, 2024, 16 pages.

Notice of Reasons for Rejection for Japanese Patent Application No. 2022-537218 with English translation dated Nov. 19, 2024, 10 pages.

Response to Office Action for Chinese Patent Application No. 202080088105.0 with amended claims in English dated Nov. 7, 2024, 18 pages.

Response to Telephone for Chinese Patent Application No. 202080088105.0 with amended claims in English dated Jan. 20, 2025, 16 pages.

* cited by examiner

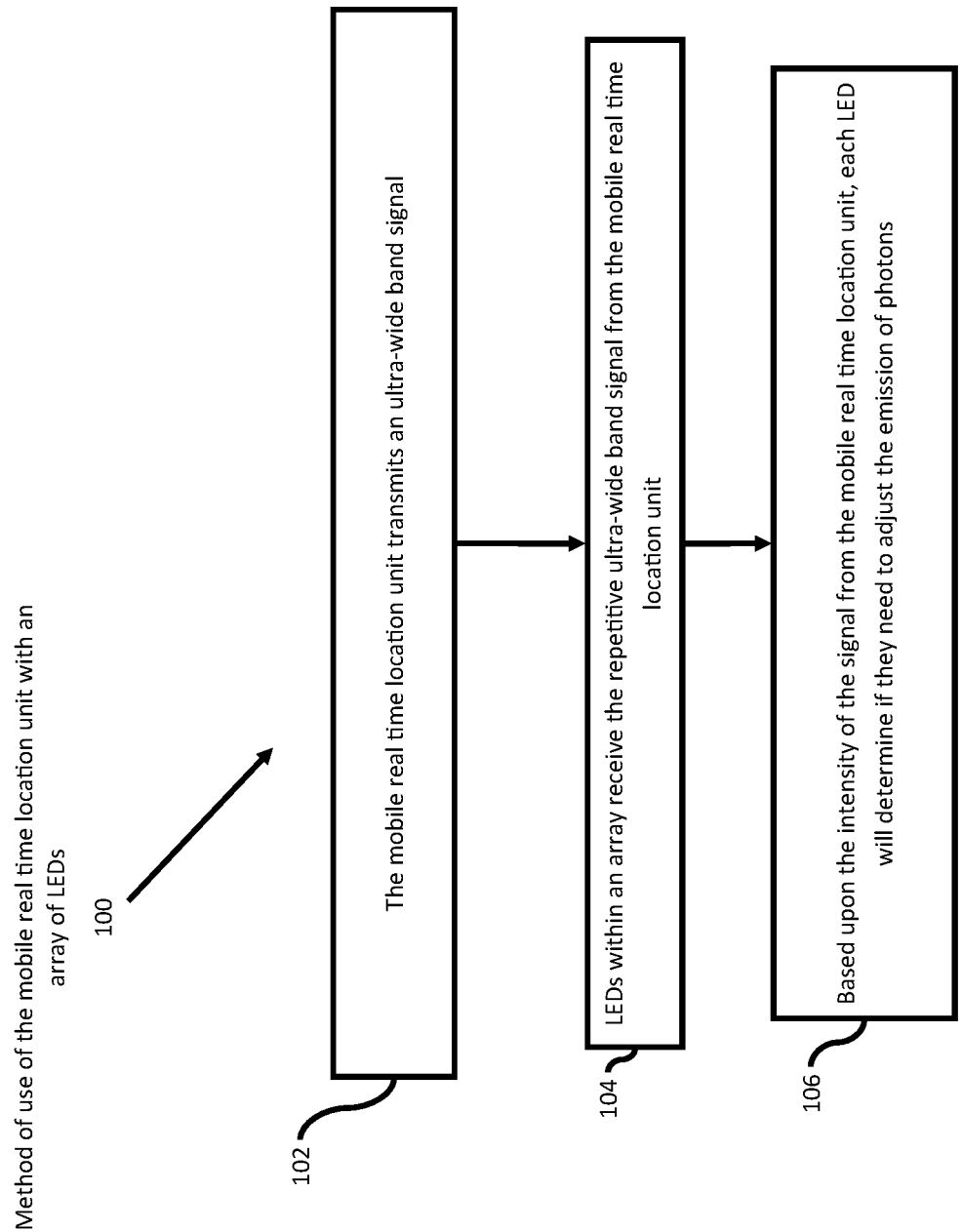

Examples of mobile real time location unit located in an array of LEDs

MOBILE REAL TIME LOCATION UNIT

CROSS REFERENCE TO RELATED MATTER

The present application claims priority to PCT Application No. PCT/US20/65634, filed Dec. 17, 2020 and U.S. Application No. 62/951,241, as filed on Dec. 20, 2019, the entire contents of both applications are incorporated herein by reference for all purposes.

SUMMARY

The following embodiments and aspects thereof are described and illustrated in conjunction with systems, tools and methods, which are meant to be exemplary and illustrative, not limiting in scope.

An embodiment of the present invention provides a system for controlling photon emission from an array of one or more light emitting devices, LED lights, the system comprising: the array of one or more LED lights configured to emit photons toward an organism; a mobile real time location unit associated with the organism, the mobile real time location unit comprising: a communication unit configured to receive and process information relating to the mobile real time location unit and to emit a data signal based said information; and a power storage unit configured to provide power to the communication unit, wherein the data signal is configured to cause the array of one of more LED lights to adjust the emission of photons.

An embodiment of the present disclosure provides a method for emitting a signal to pulsed artificial lighting system to make the pulsed artificial lighting systems stop pulsing, the method comprising: providing a mobile unit associated with an organism, the mobile unit comprising: a communication unit capable of emitting a data signal and receiving a data signal; and a power storage unit; wherein said communication unit can be in communication with a central processing unit; and wherein said power storage unit provides power for said central processing unit and said communication unit; emitting a repetitive, passive or constant signal and may be containing data regarding said organism from said communication unit; providing an array of one or more LED lights wherein said one or more LED lights is capable of emitting pulsed photons and one or more data signals as well as receiving the data signal from the mobile communication unit; wherein the array of one or more LED lights receives the data signal from the mobile unit; and based upon the presence of/or information contained in the data signal from the mobile real time location, modifying the emission of said LED lights from the array of the one or more LED lights including but not limited to making the emissions of said LED lights to turn off or to turn remain on but have emissions that are not pulsed.

Another embodiment of the present disclosure provides a mobile real time location unit comprising: a mobile housing unit comprising: a central processing unit; a communication unit capable of emitting a data signal and receiving a data signal; and a power storage unit; wherein said communication unit is in communication with the central processing unit, wherein said central processing unit is capable of providing data and commands to said communications unit; and wherein said power storage unit provides power for said central processing unit and said communication unit.

Another embodiment of the present disclosure provides a method for streaming real-time data for an organism, the method comprising: providing a mobile real time location unit associated with an organism, the mobile real time location comprising: a central processing unit; a communication unit capable of emitting a data signal and receiving a data signal; and a power storage unit; wherein said communication unit is in communication with the central processing unit; and wherein said power storage unit provides power for said central processing unit and said communication unit; emitting a repetitive, passive or constant signal containing data regarding said organism from said communication unit; providing an array of one or more LEDs wherein said one or more LEDs is capable of emitting photons and one or more data signals as well as receiving the data signal from the communication unit of the mobile real time location; wherein the array of one or more LEDs receives the data signal from the mobile real time location; and based upon the information contained in the data signal from the mobile real time location, modifying the emission of said LEDs from the array of the one or more LEDs.

BRIEF DESCRIPTION OF THE FIGURES

The accompanying drawings, which are incorporated herein and form a part of the specification, illustrate some, but not the only or exclusive, example embodiments and/or features. It is intended that the embodiments and figures disclosed herein are to be considered illustrative rather than limiting.

FIG. 1 is a flow diagram of an example method of usage of the mobile real time location unit with an array of LED lights.

DETAILED DESCRIPTION

Figure 2B:
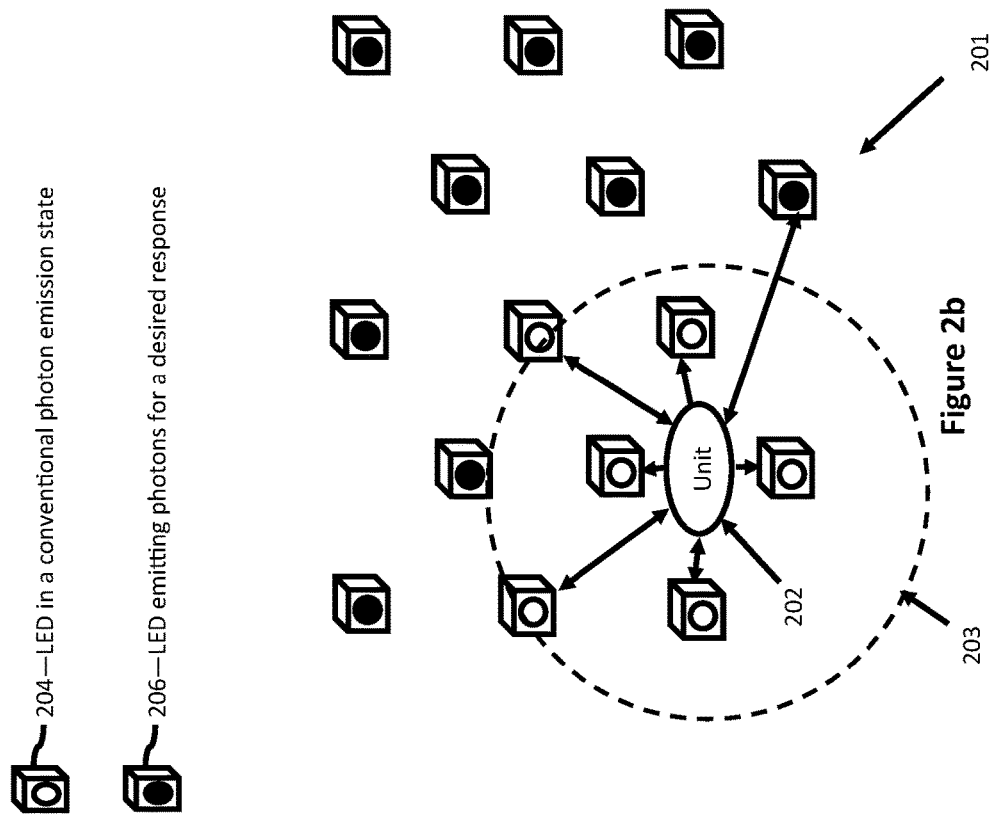
FIGS. 2a and 2b are examples of a mobile real time location unit in use in an array of LED lights to allow the LED lights to know the location as well as additional information of a person, animal or plant associated with the mobile real time location unit.

Embodiments provided herein provide mobile real time location units for use with an organism, such as a mammal, bird, reptile, or plant where the mobile real time location unit communicates data regarding the organism, such as the location, identity, health, behavior of the organism or the environment around the organism to lighting arrays or lighting networks around the organism. The data from the mobile real time location unit is processed by the lighting network and based on the data, the photon emission of the lighting may be adjusted to account for the needs or protection of the organism.

The lighting networks provided herein and described in U.S. Application No. 62/951,241 provide methods for inducing desired biological responses in an organism by emitting a photon signal from one or more LED lights with two or more components that are designed to induce a biological response by stimulating photoreceptors of an organism and/or then resetting the photoreceptor to allow for further stimulation of the photoreceptor. A specific photon signal from an LED light may be designed to stimulate an ovulation response specific to a bird, however if a person walked into the same room, they may not want to be stimulated by the same photon signal. The mobile real time location unit is designed to be worn by a person or attached to an organism and to emit a signal toward at least one LED light to indicate the presence of the organism in the vicinity of the LED light or to provide the LED light with information regarding the organism. Based on presence, instructions or commands, the LED light will then change the lighting emitted to the organism, such as a person, of an unwanted photon emission and resulting in an unwanted biological response or modification of the emission to enhance a wanted biological response. The system and methods provided herein, allow for isolated LED lights to be amended only in the vicinity of the organism associated with the mobile real time location unit while allowing other LED lights outside the vicinity to continue their programmed emission.

As will be described in more detail herein, the mobile real time location unit communicates and receives wireless signals with an array of LED lights or individual LED lights that allow the LED lights to determine the relative position of the mobile real time location units in relation to the LED lights as well as additional information relevant to the organism in relation to the mobile real time location units, allowing the LED lights to adjust their photon emissions as necessary depending on the location and needs of the organism associated with the device.

A variety of "LED lights", light emitting devices or lighting assembly having a network of lighting elements capable of a modulated emission of photons to send a repetitive pulse, waveform or pulse train of photons, where each individual pulse comprises at least one color spectrum, wavelength or multiple color spectrums or wavelengths and is capable varying intensities. The LED light may be a simple unit that is simply a photon emitter or it may be a unit with one or more emitters in communication with a controller as well as signal emitters and sensors. A number of LED lights maybe used with the disclosure provided herein, as will be understood by one skilled in the art, including but not limited to, but is not limited to, modulation of incandescent lights such as Tungsten-halogen and Xenon, Fluorescent (CFL's), high intensity discharge such as Metal Halide, High-Pressure Sodium, Low-Pressure Sodium, Mercury Vapor, sunlight, light emitting diodes.

As used herein, wavelength or color spectrum range 0.1 nm to 1600 nm in width includes infrared, red, with near and far red (620 nm-800 nm) orange (620 nm-590 nm), yellow (590 nm to 520 nm) green, cyan (520 nm to 500 nm), blue (500 nm to 435 nm) violet and ultraviolet (450 nm to 380 nm) and white light. Photoreceptors of organisms are capable of absorbing specific wavelengths which stimulate chemical changes within the organism to stimulate a specific biological response.

As used herein, the term "ON duration" or "ON durations", refers to the duration when an LED light is emitting photons or light, where the durations of emission can be between 0.001 microseconds and 5000 milliseconds.

As used herein, the term "OFF duration" or "OFF durations" refers to the duration where an LED light is not emitting photons or light.

As used herein, "organism" may include, but is not limited to, humans, ungulates, including but not limited to cattle, horses, camels, pigs, deer, elk, alpacas, lamas, and moose, carnivores, including but not limited to bears, the weasel family, dogs, cats, wolves, lions, tigers, skunks, rodents, including but not limited to rats, mice, and beaver, chiropteras, including but not limited to bats, marsupials, including but not limited to kangaroos and opossums and cetacean, including, whales and dolphins, chickens, grouse, quail, pheasant, quail, parrots, water fowl, geese, swans, doves, organisms of prey, song organisms, turkey, owls, vultures, penguins, humming birds, ostrich, duck, mollusks, such as clams, oysters, octopuses, squid, snails; arthropods such as millipedes, centipedes, insects, spiders, scorpions, crabs, lobsters, shrimp; annelids, such as earthworms and leeches; sponges; and jellyfish, microorganisms, algae, bacteria, fungi, gymnosperms, angiosperms and pteridophytes, citrus, table grapes, wine grapes, bananas, papaya, *Cannabis* sp., coffee, goji berries, figs, avocados, guava, pineapple, raspberries, blueberries, olives, pistachios, pomegranate, artichokes and almonds; vegetables such as artichokes, asparagus, bean, beets, broccoli, Brussel sprouts, Chinese cabbage, head cabbage, mustard cabbage, cantaloupe, carrots, cauliflower, celery, chicory, collard greens, cucumbers, daikon, eggplant, endive, garlic, herbs, honey dew melons, kale, lettuce (head, leaf, romaine), mustard greens, okra, onions (dry & green), parsley, peas (sugar, snow, green, black-eyed, crowder, etc.), peppers (bell, chile), pimento, pumpkin, radish, rhubarb, spinach, squash, sweet corn, tomatoes, turnips, turnip greens, watercress, and watermelons; flowering type bedding plants, including, but not limited to, *Ageratum, Alyssum, Begonia, Celosia, Coleus*, dusty miller, *Fuchsia, Gazania, Geraniums*, gerbera daisy, *Impatiens, Marigold, Nicotiana*, pansy/*Viola, Petunia, Portulaca, Salvia, Snapdragon, Verbena, Vinca*, and *Zinnia*; potted flowering plants including, but not limited to, African violet, *Alstroemeria, Anthurium, Azalea, Begonia, Bromeliad, Chrysanthemum, Cineraria, Cyclamen*, Daffodil/*Narcissus, Exacum, Gardenia, Gloxinia, Hibiscus, Hyacinth, Hydrangea, Kalanchoe*, Lily, Orchid, *Poinsettia, Primula*, regal pelargonium, rose, tulip, *Zygocactus/Schlumbergera*; foliage plants including, but not limited to, *Aglaonema, Anthurium, Bromeliad, Opuntia*, cacti and succulents, Croton, *Dieffenbachia, Dracaena, Epipremnum*, ferns, ficus, *Hedera* (Ivy), *Maranta/Calathea*, palms, *Philodendron, Schefflera, Spathiphyllum*, and *Syngonium*. cut flowers including, but not limited to, *Alstroemeria, Anthurium, Aster*, bird of paradise/*Strelitzia*, calla lily, carnation, *Chrysanthemum*, Daffodil/*Narcissus*, daisy, *Delphinium, Freesia*, gerbera daisy, ginger, *Gladiolus, Godetia, Gypsophila*, heather, iris, *Leptospermum, Liatris*, lily, *Limonium, Lisianthus*, Orchid, Protea, Rose, *Statice, Stephanotis*, Stock, Sunflower, Tulip; cut cultivated greens including, but not limited to, plumosus, tree fern, boxwood, soniferous greens, *Cordyline, Eucalyptus, hedera*/Ivy, holly, leatherleaf ferns, *Liriope*/Lilyturf, Myrtle, *Pittosporum, Podocarpus*; deciduous shade trees including, but not limited to, ash, birch, honey locust, linden, maple, oak, poplar, sweet gum, and willow; deciduous flowering trees including, but not limited to, *Amelanchier*, callery pea, crabapple, crapemyrtle, dogwood, flowering cherry, flowering plum, golden rain, hawthorn, *Magnolia*, and redbud; broadleaf evergreens including, but not limited to, *Azalea*, cotoneaster, *Euonymus*, holly, *Magnolia, Pieris, Privet, Rhododendron*, and *Viburnum*; coniferous evergreens including, but not limited to, Arborvitae, cedar, cypress, fir, hemlock, juniper, pine, spruce, yew; deciduous shrubs and other ornamentals including, but not limited to, buddleia, hibiscus, lilac, *Spirea, Viburnum, Weigela*, ground cover, bougainvillea, clematis and other climbing vines, and landscape palms; fruit and nut plants including, but not limited to, citrus and subtropical fruit trees, deciduous fruit and nut trees, grapevines, strawberry plants, other small fruit plants, other fruit and nut trees; cut fresh, strawberries, wildflowers, transplants for commercial production, and aquatic plants; pteridophyte plants including, but not limited to ferns and fungi including but not limited to basidiomycetes, ascomycetes, and sacchromycetes. The system of the present disclosure provides a photon pulse for both C3 and C4 photosystems as well as "CAM" plants (Crassulacean acid metabolism), cyanobacteria or eukaryotic green algae or other organisms.

As will be discussed in further detail, the modulation or pulsing of photons or light from an artificial LED light source to an organism, can stimulate or influence a variety of desired biological responses or functions, including but not limited to, fertility, ovulation, hunger, egg production, sexual maturity, milk production, hormone production, behavior and socialization, root, tissue or hyphal growth, vegetative growth, flower or fruiting body production, fruit, spore or seed production, stopping growth, elongation of a specific plant part, repairing an organism or destruction of the organism and interpolation of circadian inputs. Examples include, but are not limited to; creating a signal with one, two or more components of electro-magnetic wave emission pulse trains (photons or light) of individual color spectrums in sufficient intensity to drive photochemical response in an organism to control a desired biological function, using the relationship between the timing of ON durations of at least two components within a repetitive signal. Specifically, by providing a signal with one or multiple repetitive photons or light pulses at specific combination of rates relative to the timing of the ON duration of each component, including intensities, waveforms, photochemical responses by organisms can be stimulated and optimized and adjusted controlled or determined manner.

As used herein a number of sensors may be incorporated into the mobile real time location unit or attached to an organism and communicated to the mobile real time unit in order to provide various information about the organism associated with the mobile real time location unit as well as the environment around the mobile real time location unit. Examples of such sensors may include but are not limited to temperature sensors, smoke, moisture, barometers, stem diameter, GPS, accelerometers, heart rate, blood pressure, ovulation, hormone tracking, such as pheromones, estrogen, testosterone and cortisol (which may be used to monitor stress) as well as vibration, sound and vocalization to list of measurements.

As used herein a wireless network is an electronic network that uses wireless data connections between network nodes. Wireless networking is a method by which homes, telecommunications networks and business installations avoid the costly process of introducing cables into a building, or as a connection between various equipment locations. [2] Wireless telecommunications networks are generally implemented and administered using radio communication. This implementation takes place at the physical level (layer) of the OSI model network structure. Examples of wireless networks include cell phone network, wireless local area networks (WLANs), wireless ad hoc networks, Bluetooth, Zigbee, wireless sensor networks, satellite communication networks, and terrestrial microwave networks.

As used herein a mesh network (or simply meshnet) is a local network topology in which the infrastructure nodes (i.e., bridges, switches, and other infrastructure devices) connect directly, dynamically and non-hierarchically to as many other nodes as possible and cooperate with one another to efficiently route data from/to clients. This lack of dependency on one node allows for every node to participate in the relay of information. Mesh networks dynamically self-organize and self-configure, which can reduce installation overhead. The ability to self-configure enables dynamic distribution of workloads, particularly in the event that a few nodes should fail. This in turn contributes to fault-tolerance and reduced maintenance costs As used herein a gateway may be a networking device that providers unidirectional control over a lighting network, a mesh network, a network of sensors, environmental controls or a combination thereof and allows them to communicate in a synchronous manner and to communicate to the outside world.

As used herein, a master is a device with unidirectional control over one or more other devices, such as a LED light, sensor or environmental controller.

As used herein, "duty cycle" is the length of time it takes for a device to go through a complete ON/OFF cycle or photon signal. Duty cycle is the percent of time that an entity spends in an active state as a fraction of the total time under consideration. The term duty cycle is often used pertaining to electrical devices, such as switching power supplies. In an electrical device, a 60% duty cycle means the power is on 60% of the time and off 40% of the time. An example duty cycle of the present disclosure may range from 0.01% to 90% including all integers in between.

As used herein "frequency" is the number of occurrences of a repeating event per unit time and any frequency may be used in the system of the present disclosure. Frequency may also refer to a temporal frequency. The repeated period is the duration of one cycle in a repeating event, so the period is the reciprocal of the frequency.

As used herein, the term "waveform" refers to the shape of a graph of the varying quantity against time or distance.

As used herein, the term "pulse wave" or "pulse train" is a kind of non-sinusoidal waveform that is similar to a square wave, but does not have the symmetrical shape associated with a perfect square wave. It is a term common to synthesizer programming and is a typical waveform available on many synthesizers. The exact shape of the wave is determined by the duty cycle of the oscillator. In many synthesizers, the duty cycle can be modulated (sometimes called pulse-width modulation) for a more dynamic timbre. The pulse wave is also known as the rectangular wave, the periodic version of the rectangular function.

As used herein, the term "offset" means a ON duration of a pulse that is initiated at a different timing from the ON duration of another pulse. By way of example, a first photon pulse may be initiated at the start of a repetitive cycle or duty cycle with a second photon pulse.

As used herein, Radio-frequency identification (RFID) uses electromagnetic fields to automatically identify and track tags attached to objects. The tags contain electronically stored information. Passive tags collect energy from a nearby RFID reader's interrogating radio waves. Active tags have a local power source (such as a battery) and may operate hundreds of meters from the RFID reader. Unlike a barcode, the tag need not be within the line of sight of the reader, so it may be embedded in the tracked object. RFID is one method of automatic identification and data capture (AIDC).

As used herein, Ethernet, is a family of computer networking technologies commonly used in local area networks (LAN), metropolitan area networks (MAN) and wide area networks (WAN).

As used herein, "Bluetooth" is a wireless technology standard for exchanging data between fixed and mobile devices over short distances using short-wavelength UHF radio waves in the industrial, scientific and medical radio bands, from 2.400 to 2.485 GHz, and building personal area networks (PANs). It was originally conceived as a wireless alternative to RS-232 data cables.

As used herein, "Zigbee" is an IEEE 802.15.4-based specification for a suite of high-level communication protocols used to create personal area networks with small, low-power digital radios, such as for home automation, medical device data collection, and other low-power low-bandwidth needs, designed for small scale projects which need wireless connection. Hence, Zigbee is a low-power, low data rate, and close proximity (i.e., personal area) wireless ad hoc network.

As used herein, photons are massless, elementary particles with no electric charge. Photons are emitted from a variety of sources such as molecular and nuclear processes, the quantum of light and all other forms of electromagnetic radiation. Photon energy can be absorbed by phytochromes and chromophores in living plants and animals who convert it into an electrochemical signal which manipulates a metabolite or other chemical function.

FIG. 1 provides a flow chart, for an example of the method of using the mobile real time location unit to monitor the location, health and/or environment of an organism, such as a person, horse, cow, bird or plant in relation to an array of LED lights emitting pulsed photons in order to induce a desired biological response. As shown in FIG. 1, in step 102 a mobile real time location unit associated with an organism repetitively, constantly, or passively transmits a signal, such as an ultra-wide band signal or RFID. The mobile real time location unit may be associated with an organism by hanging the unit around the next of a person on a lanyard, on the collar of a mammal or bird or attached to plant. The signal emitted by the mobile real time location unit may contain data regarding the organism. The unit is associated with such as the identity of the organism, type of organism, age, sex and prior medical or heath data and history as well as information such as the heart rate, blood pressure, stress levels as well as the temperature of the organism as well as the location of the organism in relation to each LED light. In step 104, an array of LED lights emitting photons receive the repetitive ultra-wide band signal from the mobile real time location unit. Each LED light within the array may also emit a signal with data that is received by the mobile real time location unit. In step 206, based upon the presence of the signal from the mobile real time location unit as well as the intensity of the signal from the mobile real time location unit, each LED light determines its distance from the mobile real time location and/or other determining factors such as identification, each LED light will determine if they need to adjust its emission of photons. This allows for an organism, such as a person, to walk into a facility with one or more LED light arrays that are emitting photons directed toward organisms to induce a desired biological effect, such as ovulation in chickens, the LED light array to identify the presence and location of the person wearing the mobile real time location device and for the LED light to adjust the emission of photons to a new emission pattern of photons or to stop the modulation of photons from the LED light. However, the use of the mobile real time location unit and its communication with the LED light arrays in a facility allow for only the LED lights in the vicinity of the person to change their photons without effecting the emission of other LED lights in the facility. After the person moves out of range of the said LED light, the LED light would either return to its previous emission recipe or transition into a new temporary emission recipe.

In another embodiment of the present disclosure, each LED light in an LED light array also emits an output signal, such an ultra-wide broad band signal or a contains RFID that is received or sensed by the mobile real time location unit. The signal from the LED light provides information to the mobile real time location unit regarding the LED light as well as provides information on the location of the LED light in the facility, and based on the signal strength and direction, allows the mobile real time location unit to know where each LED light is in relation to the mobile real time location unit.

Each LED light may be singular or part of an array of two to more LED lights. The array of LED lights may be in communication by a hardwired connection to each other or may communicate with each other wirelessly, such as by a mesh network. The LED light array may be in communication with at least one master which provides instructions to each LED light as well as receives information from the LED light about the LED light as well as any information and data that has been received from a mobile real time location unit. A gateway may also be used to provide command control of multiple arrays in communications masters that may be in multiple locations or for separate LED light arrays with different instructions and commands.

Figure 2A:
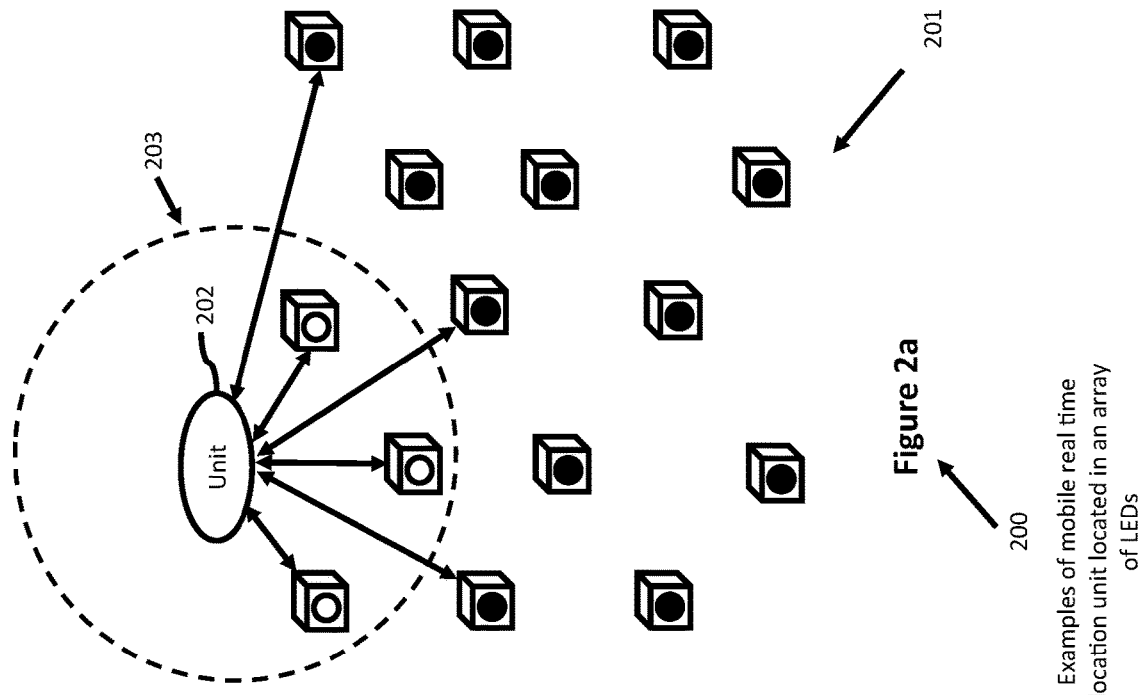
Figure 4:
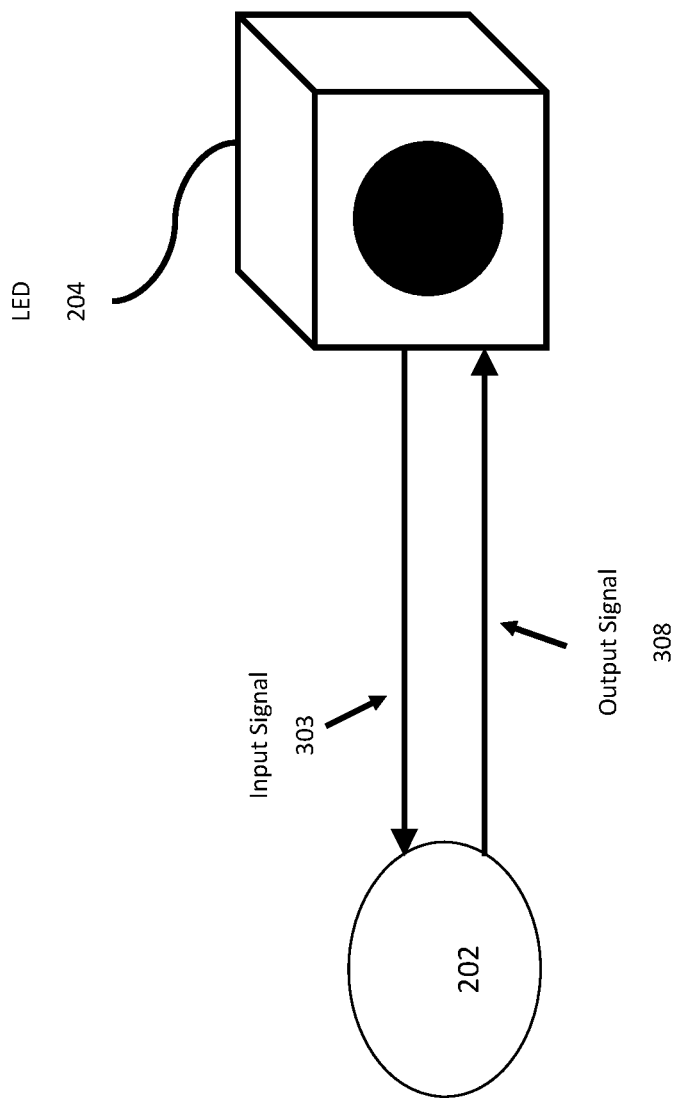
FIG. 4 in an example of two-way communications between a mobile real time location unit and an LED.

FIGS. 2a and 2b are examples of a mobile real time location unit in association with an organism, such as a person, as they move through an area radiated by an array of LED lights where the mobile real time location unit is in singular or two-way communication with each LED light in the array 200. As shown in FIG. 2a, an array 201 of fifteen (15) LED lights 204 and 206 are shown with a mobile real time location unit 202. The mobile real time location unit 202 is emitting a signal 203 with information regarding its position. Three (3) LED lights 204 in the vicinity of the mobile real time location unit 202 have received the signal 203 and have reacted to the presence of the mobile real time location unit 202 and switched to their photon emission to conventional light. The remaining LED lights 206 in the network or array 201 not in a vicinity of the person, animal or plant will continue to emit photons for specific desired response on the organism receiving the emission. As further shown in FIG. 2a and provided in closer detail in FIG. 4, the system provided herein allows for singular or two-way communication between each LED light 204 and the mobile real time location unit 202. As shown in FIG. 2a and FIG. 4, each LED light 204 can also emits an input signal 203 and 303 back to the mobile real time location unit 202 with data related to the light 204 and the associated array while the LED light is also receiving the output signal 203 and 308 from the unit 203 with information related to the unit 203 as well as the organism associated with the unit 203.

As shown in FIG. 2b, the mobile real time location unit or sensor 202 has moved further into the LED lighting network 201 where the lights in the network have received a signal 203 from the mobile real time license unit 202 on a person, animal or plant which instructs LED lights 204 in the vicinity of the person to change their light recipe emitted to that of a conventional light. As shown in FIG. 2b, five (5) photon housing units 204 are now in the vicinity of the mobile real time location unit 202 and have reacted to the presence of the unit 202, switching their photon emission to an alternative emission, such as full spectrum conventional lighting. The remaining LED lights 206 in the network array continue to emit photons for specific desired response.

Figure 3:
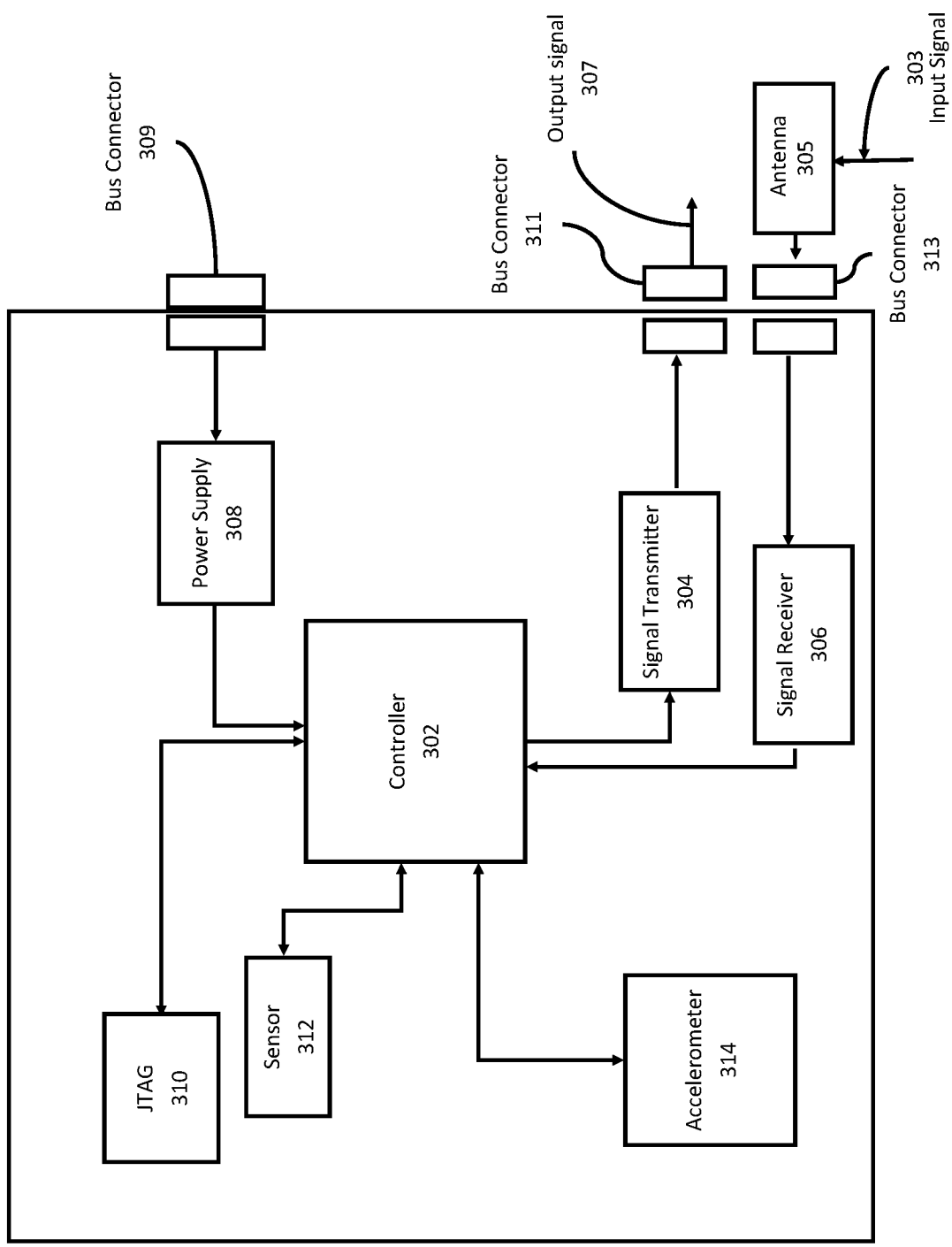
FIG. 3 is an example schematic of a mobile real time location unit.

FIG. 3 provides a schematic of the structure of a mobile real time location unit 300. As shown in FIG. 3, the mobile real time location unit 202 comprises a controller 302, a signal transmitter 304, a signal receiver 306 (such as a ST microelectronics' Spirit wireless radio) operably coupled to an antenna 305 through a bus connector 311 and 313, that transmits and receive signals to and from LED lights, a power supply or source 308, such as a battery, operably coupled to a bus connection 309 to allow for external power supply. In addition, the mobile real time unit 201 may also include additional features such as a quick reset, such as a JTAG 310 and one or more sensors or sensor receivers 312, such as an accelerometer 314.

The controller 302 provides commands to the signal transmitter 304 that emits an output signal out of the mobile real time location unit 202 that is to be received by one or more LED lights. The output signal may be simply a signal that is used by the LED light to determine the distance and direction of the mobile real time location unit 202 or the output signal may also contain information regarding the organism associated with the mobile real time location unit 202. The signal receiver 306 receives input signals 307 through the antenna 305 where the signal is relayed to the controller 302 where the data in the signal is processed.

The controller 302 may receive information from the one or more sensors 312 and 314 or receivers that receive information from external sensors regarding the location of the unit 202 as well as the health and state of the organism and the environment associated with the mobile real time location unit 202. The controller 302 will process the data from the sensors 312 and 314 which are emitted as an output signal 307 through the signal transmitter 304.

In another embodiment, the mobile real time location unit 202 may also include buttons in communication with the controllers 302 that allows a person to send communication signals or output signal 307 from the mobile real time location unit 202 to each LED light to allow the mobile real time location unit 202 to change the photon signal emitted from the LED light or functionality of the LED light and sensors. This allows a person to check the functionality of the LED light to confirm each LED light or an array of LED lights are functioning properly and in proper communication with the unit 201.

The mobile real time location unit is used with an organism to allow individual LED lights, a lighting network or an array of LED lights and/or sensors to identify and monitor the location, status, health and environment of an organism, such as a person, mammal, bird or plant and modify or change the emission of photons as needed by the organism in order to produce or maintain a desired biological effect or in order to prevent a specific photon recipe having an undesired effect upon that person, mammal, bird or plant.

A variety of signal types may be used to be broadcast from the mobile real time location unit, by way of example a simple tone, ultra-wide band, broadband, pulse radio frequency (RF), passive RFID and others. The signal is broadcast and the reaction by each LED light is based on the presence of, intensity of the signal and/or the data contained within the signal, i.e., the stronger the intensity of the signal received by the emitter, the closer the unit is to the LED light. In an additional embodiment, each LED light may send signals to other LED lights in an array with information regarding the intensity of the signal or data within being received or the LED light may communicate directly with a master or gateway regarding the information in data signal (such as in the case of an emergency signal from the mobile real time location unit), thus allowing the LED lights to triangulate the exact location of the unit within the lighting array and to adjust their photon signals as appropriate. LED lights can be preprogramed with one or more signals which facilitates a change in light emission recipes or can received signals from a gateway with such commands.

The mobile real time location unit may be used as a safety device to prevent undesired exposure to lighting recipes but also allows use to monitor movement and time of individuals, animals or plants within an LED light network.

Example 1—Use of Mobile Real Time Location Unit with Dairy Cattle

Figure 5:
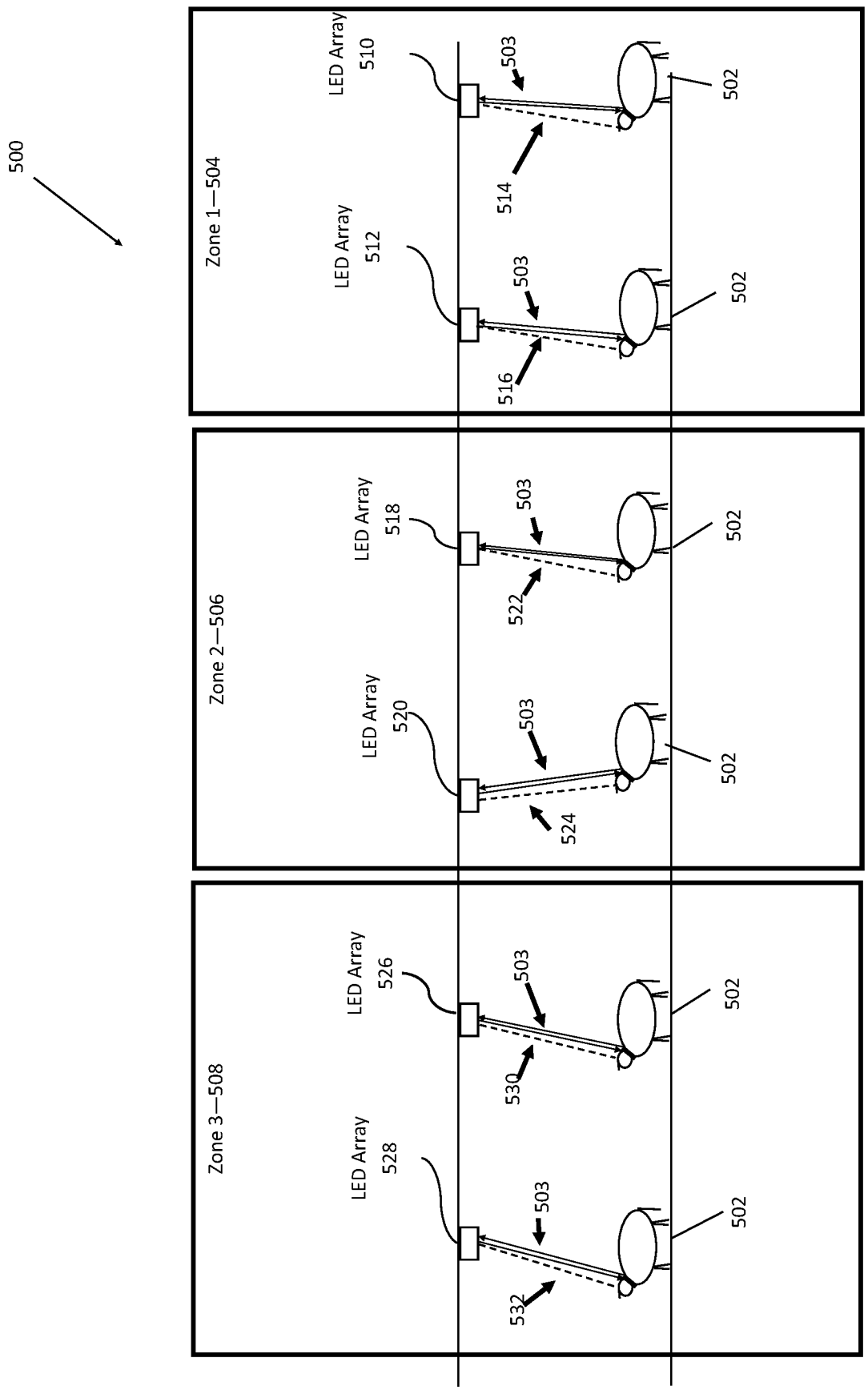
FIG. 5 is an example of the mobile real time location unit in use with a dairy cow in use with three separate zones of LED arrays in a barn.

FIG. 5 provides an example of the mobile real time location unit in use with a dairy cow. In this example, a dairy cow is in a dairy facility such as a barn 500. Three zones of LED light arrays 504, 506 and 508 are mounted in the facility to provide specific photon recipes for specific biological responses. In this example, zone one 504 is established with an LED light array 510 and 512 that emits a photon signal 514 and 516 to encourage ovulation and milk production, while zone 2 506 is established with an LED light array 518 and 520 to encourage hunger and to prevent sexual maturity to encourage growth and development of young cows while zone three 508 is established with an LED light array to also encourage sexual maturity and milk production. In this example, the cow 502 needs to be moved from zone 1 504 to zone 3 508, however the cow 502 will have to transition through zone 2 506 to get to zone 3 508. The facility does not want the cow 502 to be radiated by a photon signal that is going to reduce milk production, so as the cow moves from zone 1 and into zone 2, the mobile real time unit on the collar around the cow's neck emits an output signal 503 to the LED light array 518 and 520 in zone 2 regarding the cow's location and the need to change the photon signal 522 and 524 from the LED lights 518 and 520 in zone 2 506 in the vicinity of the cow 502 to a sexual maturity and milk production signal. As the cow 502 moves through zone 2 506, each LED light 518 and 520 in the vicinity of the cow 502 adjusts its emission 522 and 524 to prevent the cow 502 from receiving a photon signal designed to prevent sexual maturity. Then as the cow 502 moves away from each LED light 518 and 520 in zone 2 506 and into zone 3 508, each LED light 518 and 520 in zone 2 506 will adjust back to its preprogrammed photon emission. Then in zone 3 508, each LED light 526 and 528 in zone 3 508 will receive a signal 503 from the mobile real time location unit on the cow 502 providing the location of the cow within zone 3 and instructing the LED lights in zone three to emit a photon signal 530 and 532 designed to induce milk production and sexual maturity. In another embodiment, the LED lights of zone 3 may communicate with the LED lights in zones 1 and 2 to confirm the location of the cow.

Example 2—Monitoring Location of Unit with an Organism

In an example of the present disclosure, the mobile real time location unit may be worn by a person in a chicken egg laying facility. The facility may have a lighting array that is designed to emit photon signals to stimulate ovulation or sexual maturity in the birds. In this example, a person may enter the facility to feed the birds or check the health of the birds. As the person enters the facility the mobile real time location unit on the person emits a signal that may be repetitive, passive or constant that is received by the LED lights of the lighting array. The signal from the mobile real time location unit is capable of providing information to the LED lights related to the person's location in relation to the LED lights as well as the identity or presence of the mobile real time location unit. The LED lights in the array will then process the data from the signal from the mobile real time location unit and will adjust the photon emitted from LED lights in the vicinity of the mobile real time location unit to prevent modulate photon stimulation to the person. LED lights in the array outside of the vicinity of the mobile real time location unit will not be adjusted.

Example 3—Mobile Real Time Location Unit for Use in Plant Production

In an example of the present disclosure, the mobile real time location unit may be attached or associated with a plant or plant container in a vertical plant production facility on a conveyer belt that moves the plant through the facility. In this example, the facility may have various lighting arrays at different locations and elevations. A mobile real time location unit may be attached or associated with a plant container that allows the mobile real time location unit to monitor the location of the plant as well as the plant health and the environment around the plant, such as soil moisture, plant hydration, nutrient uptake as well as provide data such as plant type, age and the stage of the plant (such as rooting, vegetative, flowering, seed). As the plant is transported through the facility, the mobile real time location unit is able to emit a signal regarding the location of the plant in relation to the various lighting arrays, allowing the LED lighting arrays to adjust their photon signal recipes based on the location of the plant, type of plant and the needs of the plant.

Example 4—Facilitate Continuous Photon Radiation

In another example of the present disclosure, the mobile real time location unit may be used to facilitate the continuous dosing of a specific photon recipe to an organism while the organism is being transported from one location to another. In this example, the mobile real time location unit is attached to a person who is undergoing a photon light therapy. If the person is moved from one room to another, the mobile real time location unit can communicate with LED lights arrays in the rooms and corridors along the path where the person is being transported, sending a signal to the LED light regarding the person's location as well as the need to adjust the LED light photon signal in the immediate vicinity of the person to the photon light therapy recipe to allow for the continued photon light therapy as the person is being moved. In this example, very specific LED light arrays will be continuously modified as the person is transported to a different location allowing for the person to continuously receive their photon light therapy without a gap.

Example 5—Health and Welfare of a Person in a Facility

In an example, the mobile real time location unit may be used to monitor the location and health of a person in a facility. In this example, the mobile real time location unit is attached to a person. The mobile real time location unit emits signals to the LED lighting array in the vicinity, communicating information such as the person's ID, location, duration at that location, position relative to vertical, as well as the heart rate and other health conditions of the person. The mobile real time location unit may also have an emergency button that will communicate a signal to the LED light array that will alert the LED light array of an emergency and will instruct the LED lights to communicate an emergency to local authorities. In an additional embodiment of the current example, should the mobile real time location unit detect a fall or a health issue of a person or animal or remotely triggered such in the event of a tornado, the mobile real time location unit can emit an output signal to the LED light array that will induce the LED light array pulse red and blue lights similar to that of emergency vehicles to notify other people in the area of a problem.

Example 6—Health and Welfare Checks of a Animals in Agriculture

In an example, the mobile real time location unit may be used to verify and track health and welfare checks on animals by tracking and recording the movement of personnel in an agricultural facility under the stimulation of an artificial LED lighting arrays. In this example, the mobile real time location unit is attached to a person. The mobile real time location unit emits signals to the LED lighting array in the vicinity, communicating information such as the person's ID, location, duration at that location, and position relative to each LED light. In this example, the LED lights in the presence of the real time location unit will stop pulsing and switch to a bright steady state white light. This bright white light will better illuminate the animals under said light allowing the personnel to better evaluate the health of the animals under the LED light. The LED array along with its communications capability will then record the movements of the personnel allowing for auditing of said movements through the agricultural facility for the increased benefit of the health and welfare of the animals.

Example 7—Emergency Response

In an example, the mobile real time location unit may be used to assist in an emergency response to localize or isolate people in an emergency. For example, in an active shooter situation. Each teacher and employee of a school would wear a mobile real time location unit. If a teacher pushed a button on the unit, the mobile real time location unit can send a signal that is capable of being received by other mobile real time location units in communication with the first unit. The first unit can provide a signal to notify the other mobile real time location unit and the wearer of the unit that there is a problem.

Further, for the person in the room or location of the problem, that person can hold down a button on the mobile real time location unit for an extended prior or press a specific button. The mobile real time location unit will then send another signal that indicated to the entire lighting array of the school of the issue, where the lighting array is then able to flash lights throughout the school to indicate a problem, flash lights in a pattern or turn on specific colors to direct teachers and students to safety away from the issue as well as to pulse or flash lights in the array that would be specific to the location of the issue, directing first responders to the location of the issue. The wearer may also push a button on the unit that can indicate their current state as well as the type of issue, such as health, fire, water, weather, or a safety issue. For example. a person could say I don't hear or see anything, so I am going to push the green button. Another person might hear something but not see something so they would push the yellow button. Others may see something and push the red button. The network could then make decisions on where the risks were and light lights in a room or hallway directing people on what to do. For example, show them the direction to move away from the risks or to shelter in place The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed:

1. A system for controlling photon emission from one or more light emitting devices, LED lights, the system comprising:
   the one or more LED lights configured to emit photons toward an organism;
   a mobile real time location unit associated with the organism, the mobile real time location unit comprising:
   a communication unit configured to receive and process information relating to the mobile real time location unit and to emit a data signal based said information; and
   a power storage unit configured to provide power to the communication unit, wherein the data signal is configured to cause the one of more LED lights to adjust the emission of photons.

2. The system of claim 1, wherein said signal is chosen from a simple tone, repetitive pulse ultra-wide band, broadband, pulse radio frequency (RF), and ad hoc wireless.

3. The system of claim 1, further comprising a controller, wherein said controller is in communication with said communication unit.

4. The system of claim 1, wherein said mobile real time location unit further comprises at least one sensor, wherein said sensor is in communication with the controller and said power supply, wherein said power supply provides power to said sensor.

5. The system of claim 4, wherein said at least one sensor monitors the health of an organism.

6. The system of claim 5, wherein said at least one sensor monitors the heart rate, blood pressure, and hormone levels of an organism.

7. The system of claim 6, wherein said hormones are chosen from pheromones, estrogen, testosterone, and cortisol.

8. The system of claim 4, wherein said at least one sensor monitors the status of the organism, wherein said status is chosen from location and position in relation to vertical.

9. The system of claim 4, wherein said at least one sensor monitors the environment around the organism.

10. The system of claim 9, wherein said at least one sensor monitors an environmental condition chosen from temperature, moisture, or the barometric pressure.

11. The system of claim 1, wherein said mobile real time location unit further comprises at least one button in communication with the communication unit.

12. The system of claim 11, wherein said button is an emergency communication button.

13. The system of claim 12, wherein said button communicates an output signal to control the photon pulse of at least one LED.

14. The system of claim 13, wherein said output signal further comprises data regarding the organism, wherein the data is chosen the organism type, age of the organism, sex and identity.

15. The system of claim 13, wherein said output signal further comprises prior health data of the organism.

16. The mobile real time location unit according to claim 1.

* * * * *